United States Patent
Diss et al.

(10) Patent No.: US 11,325,355 B2
(45) Date of Patent: May 10, 2022

(54) PROCESS FOR MANUFACTURING A FIBROUS PREFORM FILLED WITH PARTICLES

(71) Applicant: SAFRAN CERAMICS, Le Haillan (FR)

(72) Inventors: Pascal Diss, Moissy-Cramayel (FR); Florent Deliane, Bordeaux (FR); Natacha Duee, Talence (FR)

(73) Assignee: SAFRAN CERAMICS, Le Haillan (FR)

( * ) Notice: Subject to any disclaimer, the term of this patent is extended or adjusted under 35 U.S.C. 154(b) by 390 days.

(21) Appl. No.: 16/625,473

(22) PCT Filed: Jun. 22, 2018

(86) PCT No.: PCT/FR2018/051515
§ 371 (c)(1),
(2) Date: Dec. 20, 2019

(87) PCT Pub. No.: WO2018/234714
PCT Pub. Date: Dec. 27, 2018

(65) Prior Publication Data
US 2021/0155552 A1     May 27, 2021

(30) Foreign Application Priority Data
Jun. 23, 2017 (FR) ........................... 1755787

(51) Int. Cl.
*C04B 35/80* (2006.01)
*B32B 18/00* (2006.01)
(Continued)

(52) U.S. Cl.
CPC ............ *B32B 18/00* (2013.01); *C04B 35/117* (2013.01); *C04B 35/14* (2013.01); *C04B 35/18* (2013.01);
(Continued)

(58) Field of Classification Search
CPC ... B32B 18/00; C04B 35/62847; C04B 35/80; C04B 2235/5256; C04B 2235/616
See application file for complete search history.

(56) References Cited

U.S. PATENT DOCUMENTS

| 4,983,422 A | 1/1991 | Davis et al. |
| 2009/0078514 A1 | 3/2009 | Baud et al. |
| 2014/0200130 A1* | 7/2014 | Szweda ................... C04B 35/14 |
| | | 501/95.2 |

FOREIGN PATENT DOCUMENTS

| FR | 2 645 852 A1 | 10/1990 |
| RU | 2 407 718 C2 | 12/2010 |

(Continued)

OTHER PUBLICATIONS

Translation of International Search Report IPA# PCT/FR2018/051515, dated Oct. 9, 2018 (Year: 2018).*
(Continued)

*Primary Examiner* — Nathan H Empie
(74) *Attorney, Agent, or Firm* — Pillsbury Winthrop Shaw Pittman LLP

(57) ABSTRACT

A process for manufacturing a fibrous preform filled with particles, includes forming the filled preform by compacting a stack of a plurality of fibrous strata impregnated by a suspension of ceramic oxide particles in a liquid medium, wherein the liquid medium includes at least one compound having a saturated vapor pressure of less than 2.3 kPa at 20° C., this compound being present in a weight content of greater than or equal to 30% relative to the total weight of the suspension.

12 Claims, 1 Drawing Sheet

(51) Int. Cl.
    *C04B 35/628*     (2006.01)
    *C04B 35/117*     (2006.01)
    *C04B 35/14*     (2006.01)
    *C04B 35/18*     (2006.01)
    *C04B 35/185*     (2006.01)
    *C04B 35/64*     (2006.01)

(52) U.S. Cl.
    CPC ...... *C04B 35/185* (2013.01); *C04B 35/62847* (2013.01); *C04B 35/80* (2013.01); *C04B 35/64* (2013.01); *C04B 2235/5256* (2013.01); *C04B 2235/616* (2013.01)

(56) References Cited

FOREIGN PATENT DOCUMENTS

| WO | WO 2016/016388 A1 | 2/2016 |
| WO | WO 2017/220727 A1 | 12/2017 |

OTHER PUBLICATIONS

International Search Report as issued in International Patent Application No. PCT/FR2018/051515, dated Oct. 9, 2018.
Product Guide: "Ethylene Glycol," Jan. 2008, XP055450445, Retrieved from the Internet: URL:http://www.meglobal.biz/media/product_guides/MEGlobalMEG.pdf, retrieved on Feb. 12, 2018, 34 pages.

* cited by examiner

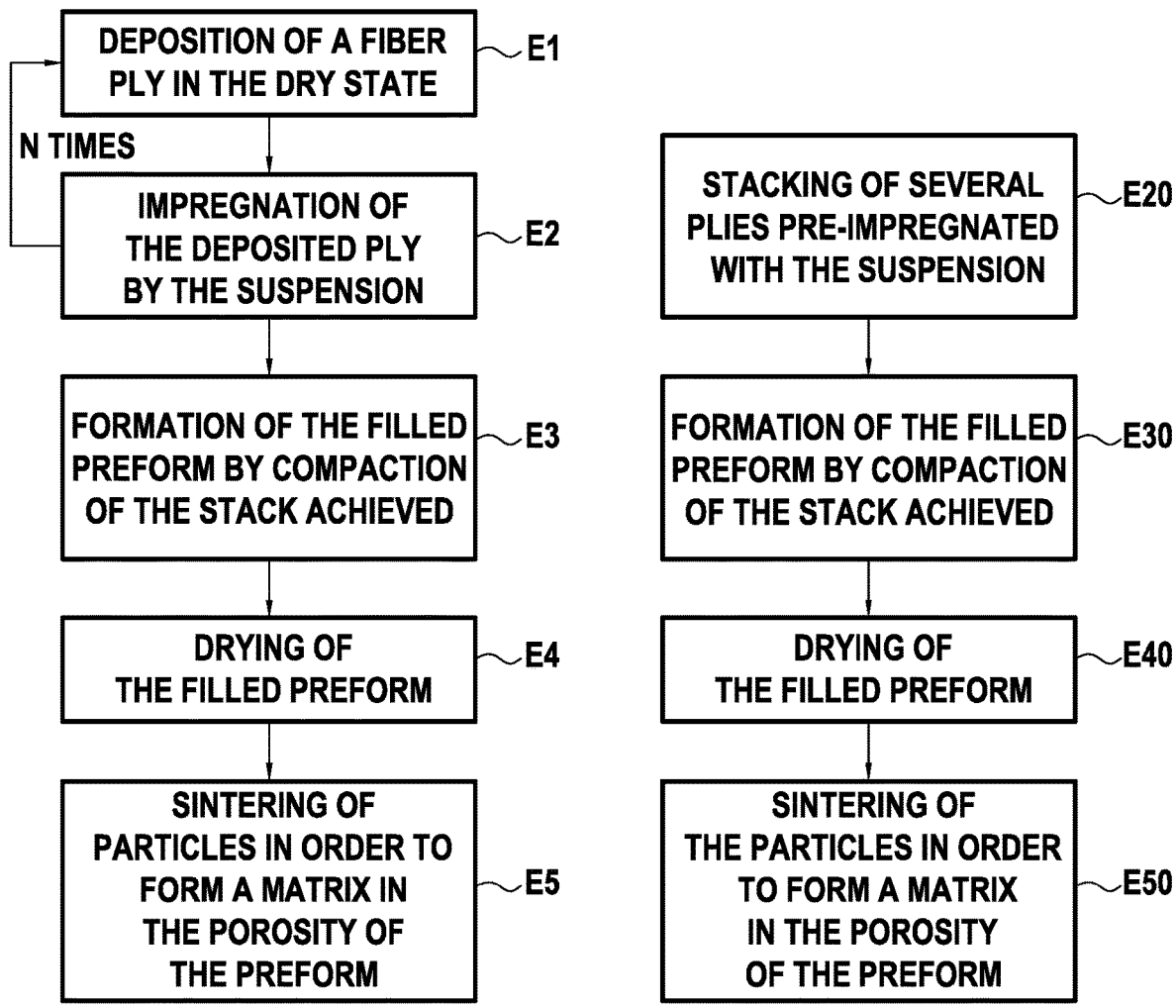
FIG.1
FIG.2
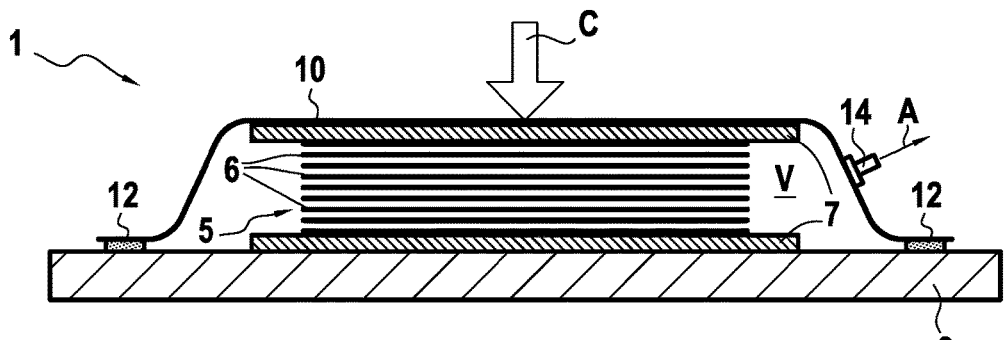
FIG.3

PROCESS FOR MANUFACTURING A FIBROUS PREFORM FILLED WITH PARTICLES

CROSS-REFERENCE TO RELATED APPLICATIONS

This application is the U.S. National Stage of PCT/FR2018/051515, filed Jun. 22, 2018, which in turn claims priority to French patent application number 1755787 filed Jun. 23, 2017. The content of these applications are incorporated herein by reference in their entireties.

The present invention concerns a method for manufacturing a fiber preform filled with particles of ceramic oxide, as well as the manufacture of a composite material part from such a preform.

BACKGROUND OF THE INVENTION

It is known to form the preform of a part made of oxide matrix composite material by stacking a plurality of fiber plies impregnated with a suspension of oxide particles in a liquid medium.

Once formed, the stack is compacted in order to set its final thickness. A drying step is then carried out in order to remove the liquid medium of the suspension. The oxide matrix is then formed in the porosity of the obtained fiber preform, by sintering the particles.

It is however desirable to improve the mechanical properties presented by the parts obtained by such techniques.

OBJECT AND SUMMARY OF THE INVENTION

The invention relates, according to a first aspect, to a method for manufacturing a fiber preform filled with particles, the method comprising at least the following step:
  forming the filled preform by compacting a stack of a plurality of fiber plies impregnated with a suspension of particles of ceramic oxide in a liquid medium,
  the liquid medium including at least one compound having a saturation vapor pressure less than 2.3 kPa (2300 Pa) at 20° C., this compound being present at a mass content greater than or equal to 30% relative to the total weight of the suspension.

The inventors have found that the limitations of the techniques of the prior art result from the rapid evaporation of the liquid medium of the suspension. This evaporation leads to an early draining of the fiber plies, thereby affecting their deformability and their adhesive strength, and results in premature delamination of the stack formed if the method is not carried out quickly enough. In addition, this draining leads to an increase in the viscosity of the suspension, making its flow through the fiber network during compaction more difficult.

The invention is remarkable in that it implements a suspension comprising, at a rate of at least 30% by mass, a compound in the liquid state having a saturation vapor pressure lower than that of water or alcohols typically used in the suspensions of the prior art. The presence of this compound makes it possible to delay the evaporation of the liquid medium relative to the suspensions of the prior art. Thus, the plies maintain longer a good deformability and a good adhesive strength, reducing the risk of delamination of the stack. In addition, this suspension flows easily during the compaction, leading to the desired distribution for the fillers within the fiber preform, and therefore to the mechanical properties targeted for the part to be obtained.

In the following, for the sake of brevity, the "compound having a saturation vapor pressure less than 2.3 kPa at 20° C." will be referred to as "compound".

In one exemplary embodiment, the compound has a saturation vapor pressure less than or equal to 0.6 kPa (600 Pa) at 20° C.

Such a characteristic advantageously makes it possible to further reduce the rate of evaporation of the liquid medium.

In one exemplary embodiment, the compound is chosen among: glycerol, lactic esters, dimethyl-2-methylglutarate, and mixtures thereof.

The implementation of these specific compounds advantageously makes it possible to give the suspension a particularly low evaporation rate.

Particularly, the compound may be glycerol.

In one exemplary embodiment, the compaction is performed by vacuum drawing.

The good flowability of the suspension can be utilized in order to perform the compaction by a vacuum drawing technique which implements a relatively low pressure. This exemplary embodiment avoids the use of an autoclave or a press using higher pressures to perform compaction. The risk of damaging the fiber stack during compaction is thus reduced.

In one exemplary embodiment, the volume content of the particles in the suspension is greater than or equal to 25% relative to the total volume of the suspension. Particularly, the suspension may comprise the particles at a volume content, relative to the total volume of the suspension, of between 25% and 50%.

The use of a suspension having a high volume ratio of particles leads to a matrix having a particularly low void ratio, without the need for an additional impregnation step.

In one exemplary embodiment, the liquid medium comprises:
  the compound at a mass content, relative to the total weight of the suspension, of between 30% and 50%, and
  a solvent, different from the compound, at a mass content, relative to the total weight of the suspension, of between 5% and 30%, for example between 10% and 30%, and
  optionally, an organic binder at a mass content, relative to the total weight of the suspension, of between 1% and 15%, for example between 3% and 10%, and optionally a dispersant at a mass content, relative to the total weight of the suspension, of between 0.1% and 1.5%, for example between 0.5% and 1%.

In one exemplary embodiment, the fiber plies are formed of fibers of ceramic oxide.

In one exemplary embodiment, the method comprises, prior to the compaction step, a step of forming the stack by depositing the plies in the dry state, the deposited ply being impregnated with the suspension before the deposition of the next ply.

Alternatively, the method comprises, prior to the compaction step, a step of forming the stack by superposition of plies pre-impregnated with the suspension.

The invention relates, according to a second aspect, to a method for manufacturing a part made of composite material, the method comprising at least the following step:
  forming a filled preform by implementing a method as described above, and
  forming a matrix in the porosity of the filled preform by sintering the particles.

BRIEF DESCRIPTION OF THE DRAWINGS

Other characteristics and advantages of the invention will become apparent from the following description, given in a non-limiting manner, with reference to the appended drawings, in which:

FIG. 1 is a flowchart showing different steps of a first exemplary method according to the invention, FIG. 2 is a flowchart showing different steps of a second exemplary method according to the invention, and FIG. 3 schematically illustrates a possible embodiment for the compaction step within the context of the present invention.

DETAILED DESCRIPTION OF EMBODIMENTS

The stack formed by a plurality of fiber plies impregnated with the suspension is first achieved. The fibers forming the plies may include alumina, or even a mixture of alumina and silica. The fibers marketed under the reference "Nextel" can be used by the company 3M.

In the exemplary method illustrated in FIG. 1, a first fiber ply in the dry state is first deposited on a support (step E1). The first ply deposited is then impregnated with the suspension comprising the particles made of ceramic oxide and the compound at a rate of at least 30% by mass relative to the total weight of the suspension. The impregnation with the suspension may be performed by any means known per se, such as a spatula or a scraper.

A second fiber ply in the dry state is then deposited on the first impregnated fiber ply (step E2). The second deposited fiber ply is superimposed on the first fiber ply. The second fiber ply deposited is then impregnated with the suspension. In the example of FIG. 1, the plies continue to be deposited in the dry state and then to be impregnated with the suspension until a stack having the desired number of impregnated plies is achieved.

As mentioned above, the liquid medium of the suspension has a low evaporation rate. This particularly allows having more time to achieve the stack without requiring the use of special precautions, thereby simplifying the implementation of the method.

The suspension includes at least the particles and the compound in the liquid state. The compound may be chosen among: glycerol, lactic esters, dimethyl-2-methylglutarate, and mixtures thereof.

As example of usable lactic esters, mention can be made of the products available under the references "galaster IPL 98" (saturation vapor pressure of 170 Pa at 20° C.) or "galaster NPL 98.5" (saturation vapor pressure of 110 Pa at 20° C.) marketed by the company Galactic. The dimethyl-2-methylglutarate has a saturation vapor pressure of 6.3 Pa at 20° C. As for glycerol, it has a saturation vapor pressure less than 0.3 Pa at 20° C.

The liquid medium of the suspension comprises at least the compound, and optionally a solvent, different from said compound. The solvent may for example be water, or an alcohol such as ethanol. When there is a solvent, the compound may be soluble or miscible in the solvent, or able to form an emulsion with the solvent. In the latter case, the addition of a dispersant may be advantageous.

The fact of adding or omitting the solvent allows adapting the viscosity of the suspension to the nature of the fiber ply used, and thus obtaining the desired impregnation of this ply.

The particles can generally have an average particle size (D50) of between 0.1 µm and 10 µm.

The ceramic oxide particles may be selected among alumina, silica, mullite particles, or a mixture of such particles.

The volume content of particles in the suspension, relative to the total volume thereof, may be greater than or equal to 25%, or even of between 25% and 50%. This volume content may be greater than or equal to 35%, or even of between 35% and 45%, relative to the total volume of the suspension. Particularly, the particles may be present at a mass content, relative to the total weight of the suspension, of between 40% and 70%, for example between 40% and 60%.

The compound at a mass content, relative to the total weight of the suspension, is for example of between 30% and 50%.

When the liquid medium comprises a solvent, the mass content of the solvent, relative to the total weight of the suspension, may be greater than or equal to 5%. This mass content may be of between 5% and 30%, for example between 10% and 30%, relative to the total weight of the suspension.

The suspension may further include an organic binder, such as polyvinyl alcohol (PVA) or an acrylic-type binder. When the organic binder is present, its mass content, relative to the total weight of the suspension, may be greater than or equal to 1%, and for example be of between 1% and 10%.

The suspension may further include a dispersant. When a dispersant is present, its mass content, relative to the total weight of the suspension, may be greater than or equal to 0.1%, for example be of between 0.1% and 1.5%, for example between 0.5% and 1%.

The contents indicated for the various constituents of the suspension are, unless otherwise mentioned, taken at the time of impregnation of the fiber plies, and therefore particularly before drying of the solvent, when such a drying is carried out.

FIG. 3 represents a vacuum drawing compaction device 1 which can be implemented within the context of the invention.

The stack 5 of plies 6 impregnated with the suspension is present on a support 3. The stack 5 is present in an internal volume V delimited by the support 3 and by a flexible membrane 10. Gaskets 12 are present between the membrane 10 and the support 3 so as to ensure the tightness of the internal volume V.

The stack 5 is positioned between two layers 7 of a peel-ply fabric in order to facilitate its removal from the device 1, once the compaction is performed.

The compaction (step E3) is performed by vacuum drawing inside the volume V by suction (arrow A) through an orifice 14 formed in the flexible membrane 10. During this vacuumization, the membrane 10 applies a compaction pressure (arrow C) on the stack 5 in order to reduce its thickness. The applied compaction pressure is here less than or equal to 1 bar.

As mentioned above, the suspension flows easily within the stack 5 during the compaction step, which makes it possible to obtain the desired distribution for the fillers within the porosity of the fiber preform, without having to apply a high pressure during the compaction. However, when the compaction is performed by other means for applying a higher compaction pressure, such as a press or an autoclave, is not considered as departing from the context of the invention. Performing the vacuum drawing compaction is however preferred.

At the end of the compaction step, a preform impregnated with the liquid medium in which the oxide ceramic particles are dispersed, is obtained. It is possible to obtain a reduction in the thickness of the stack of at least 10% during the compaction.

The solvent, optionally present in the liquid medium, may be removed by drying the filled preform (step E4). A temperature of between 50° C. and 180° C. may be imposed during this drying. The duration of the drying may be greater than or equal to 1 hour, or even be of between 1 hour and 24 hours. The drying can be carried out while the compaction pressure is applied on the stack, that is to say here while the vacuum is drawn into the internal volume V and while the membrane 10 is bearing on the stack 5, or can be carried out after compaction.

After compaction and possible drying, a matrix is formed in the porosity of the preform in order to obtain the composite material part. The preform is intended to form the fiber reinforcement of the part. The matrix is formed from the particles by sintering (step E5). The matrix is an oxide matrix, such as an alumina matrix. The sintering can be performed in air. The sintering may be performed at a temperature greater than or equal to 1,000° C., for example of between 1,000° C. and 1,200° C.

FIG. 2 relates to an alternative method in which the stack is obtained by depositing plies pre-impregnated with the suspension (step 20). In this case, the plies have been impregnated before being deposited. Once the stack is achieved, the method is continued in a manner similar to that described in relation to FIG. 1: compaction to obtain the preform (step E30), optional drying of the filled preform (step E40) and sintering of the particles in order to obtain the composite material part (step 50).

Generally, the fiber plies 6 may be unidirectional sheets or two-dimensional textures. The plies can be textures of a three-dimensional fabric.

The fiber plies 6 can be deposited one by one or, alternatively, in groups of several plies during the formation of the stack 5.

The expression "of between . . . and . . . " must be understood as including the bounds.

The invention claimed is:

1. A method for manufacturing a fiber preform filled with particles, the method comprising:
   forming the filled preform by compacting a stack of a plurality of fiber plies impregnated with a suspension of particles of ceramic oxide in a liquid medium,
   wherein the liquid medium includes at least one compound having a saturation vapor pressure less than 2.3 kPa at 20° C., the compound being present at a mass content greater than or equal to 30% relative to the total weight of the suspension, the particles being present at a mass content, relative to the total weight of the suspension, of between 40% and 70%.

2. The method according to claim 1, wherein the compound has a saturation vapor pressure less than or equal to 0.6 kPa at 20° C.

3. The method according to claim 1, wherein the compound is chosen among: glycerol, lactic esters, dimethyl-2-methylglutarate, and mixtures thereof.

4. The method according to claim 3 wherein the compound is glycerol.

5. The method according to claim 1, wherein the compaction is performed by vacuum drawing.

6. The method according to claim 1, wherein the particles are present at a mass content, relative to the total weight of the suspension, of between 40% and 60%.

7. The method according to claim 1, wherein the liquid medium comprises:
   the compound at a mass content, relative to the total weight of the suspension, of between 30% and 50%, and
   optionally a solvent, different from the compound, at a mass content, relative to the total weight of the suspension, of between 5% and 30%, and
   optionally an organic binder at a mass content, relative to the total weight of the suspension, of between 1% and 15%, and optionally
   a dispersant at a mass content, relative to the total weight of the suspension, of between 0.1% and 1.5%.

8. The method according to claim 1, wherein the fiber plies are formed of fibers of ceramic oxide.

9. The method according to claim 1, wherein the method comprises, prior to the compaction step, a step of forming the stack by depositing the plies in the dry state, the deposited ply being impregnated with the suspension before the deposition of the next ply.

10. The method according to claim 1, wherein the method comprises, prior to the compaction step, a step of forming the stack by superposition of plies pre-impregnated with the suspension.

11. A method for manufacturing a part made of composite material, the method comprising:
   forming a filled preform by implementing a method according to claim 1, and
   forming a matrix in the porosity of the preform filled by sintering the particles.

12. The method according to claim 7, wherein the dispersant is at a mass content, relative to the total weight of the suspension, of between 0.5% and 1%.

* * * * *